(12) United States Patent
Hansen et al.

(10) Patent No.: US 7,483,381 B1
(45) Date of Patent: Jan. 27, 2009

(54) REMOTE TESTING ACCESS

(75) Inventors: Kevin Harry Hansen, Shawnee, KS (US); Walt Weber, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 653 days.

(21) Appl. No.: 11/100,361

(22) Filed: Apr. 6, 2005

(51) Int. Cl.
*H04L 12/26* (2006.01)

(52) U.S. Cl. .................. 370/241; 370/242; 370/244; 370/248; 370/250; 370/252; 370/401; 379/223; 714/699; 714/712

(58) Field of Classification Search ............ 370/241, 370/242, 244, 248, 250, 252, 401; 379/15.01; 709/223; 714/699, 712
See application file for complete search history.

(56) References Cited

U.S. PATENT DOCUMENTS

| | | | | |
|---|---|---|---|---|
| 5,479,473 A | * | 12/1995 | Zey | 379/18 |
| 6,351,521 B1 | * | 2/2002 | DuRee et al. | 379/15.01 |
| 6,493,425 B1 | * | 12/2002 | Abe | 379/1.01 |
| 7,124,335 B2 | * | 10/2006 | Choi et al. | 714/712 |
| 7,197,029 B1 | * | 3/2007 | Osterhout et al. | 370/353 |
| 2004/0003070 A1 | * | 1/2004 | Fernald et al. | 709/223 |
| 2005/0213564 A1 | * | 9/2005 | Nguyen et al. | 370/352 |
| 2006/0188080 A1 | * | 8/2006 | Terpstra et al. | 379/211.02 |

* cited by examiner

*Primary Examiner*—Huy D Vu
*Assistant Examiner*—Luat Phung

(57) ABSTRACT

An embodiment of the invention includes a method of operating a remote testing access system. The method comprises receiving a test request from a test device over an incoming time division multiplexed (TDM) connection and in a TDM format wherein the test request indicates a one of a plurality of types of tests to perform on a soft switch, processing the test request to select a one of a plurality of service applications of the soft switch corresponding to the one type of test, and transmitting communications for the one type of test to the one service application in a packet format.

10 Claims, 7 Drawing Sheets

REMOTE TESTING ACCESS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of telecommunications, and in particular, to a system and method for providing remote testing access to soft switches in Voice over Packet (VoP) networks.

2. Description of the Prior Art

Call through testing systems are commonly used in circuit switched telephone networks to verify network operations. FIG. 1 illustrates public switched telephone network (PSTN) 100 in an example of call through testing in the prior art. PSTN 100 includes test device 110, remote access device 120, switch 130, switch 140, and switch 150. Remote access device has access line 101, and output lines 102, 103, and 104. In this example, test device 110 is coupled to remote access device by access line 101. Output line 102 terminates at switch 130; output line 103 terminates at switch 140; and output line 104 terminates at switch 150. Each switch typically services a distinct operating region distinguished by area codes in the PSTN dialing plan.

In the prior art, a user utilizing test device 110 is able to emulate a subscriber in any of the distinct operating regions serviced by switch 130, 140, and 150. The user dials into remote access device 120 over access line 101. The user is prompted to enter a key code indicating which switch of switches 130, 140, and 150 he desires to test. For example, a key code of 1 corresponds to switch 130, 2 corresponds to switch 140, and 3 corresponds to switch 150. Upon entering the key code, remote access device bridges the incoming call to the appropriate output line. The user is provided dial tone from the selected switch as if test device 110 were actually serviced by the selected switch. The user can then test the operations of a switch, such as number translations and voice mail services.

Recently, Voice over Packet (VoP) services have increased in popularity and availability. Unfortunately, VoP networks do not currently provide for call through testing as described for PSTN 100. For example, remote access device 120 is not capable of interfacing with soft switches. In addition, test device 110 is not capable of directly interfacing with a soft switch. Thus, testing the operation of a soft switch requires a field technician to perform on-site testing of the soft switch with test equipment customized for testing soft switches. It would be desirable to provide for remote testing of VoP networks without the need for customized test equipment.

SUMMARY OF THE INVENTION

An embodiment of the invention helps solve the above problems and other problems by providing a remote testing access system that allows for testing of soft switches in VoP networks without the need for customized test equipment. An embodiment of the invention includes a method of operating a remote testing access system. The method comprises receiving a test request from a test device over an incoming time division multiplexed (TDM) connection and in a TDM format wherein the test request indicates a one of a plurality of types of tests to perform on a soft switch, processing the test request to select a one of a plurality of service applications of the soft switch corresponding to the one type of test, and transmitting communications for the one type of test to the one service application in a packet format.

Another embodiment of the invention comprises receiving the test request into an access device coupled to a conversion device by a plurality of outgoing TDM connections.

Another embodiment of the invention comprises, in the access device, bridging the incoming TDM connection to a first outgoing TDM connection of the plurality of outgoing TDM connections based on the test request.

Another embodiment of the invention comprises, in the conversion device, selecting the one service application of the soft switch corresponding to the first outgoing TDM connection.

Another embodiment of the invention comprises converting the communications from the TDM format to the packet format in the conversion device.

Another embodiment of the invention comprises transmitting the communications in the packet format to the one service application.

Another embodiment of the invention comprises providing dial tone to the test device from the soft switch.

In an embodiment of the invention, the one service application comprises a port on the soft switch.

In an embodiment of the invention, the one type of test comprises a number translation test.

In an embodiment of the invention, the test request comprises a dual tone multi-frequency (DTMF) signal.

BRIEF DESCRIPTION OF THE DRAWINGS

The same reference number represents the same element on all drawings.

DETAILED DESCRIPTION OF THE PREFERRED EMBODIMENT

FIGS. 2-7 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

Figure 1:
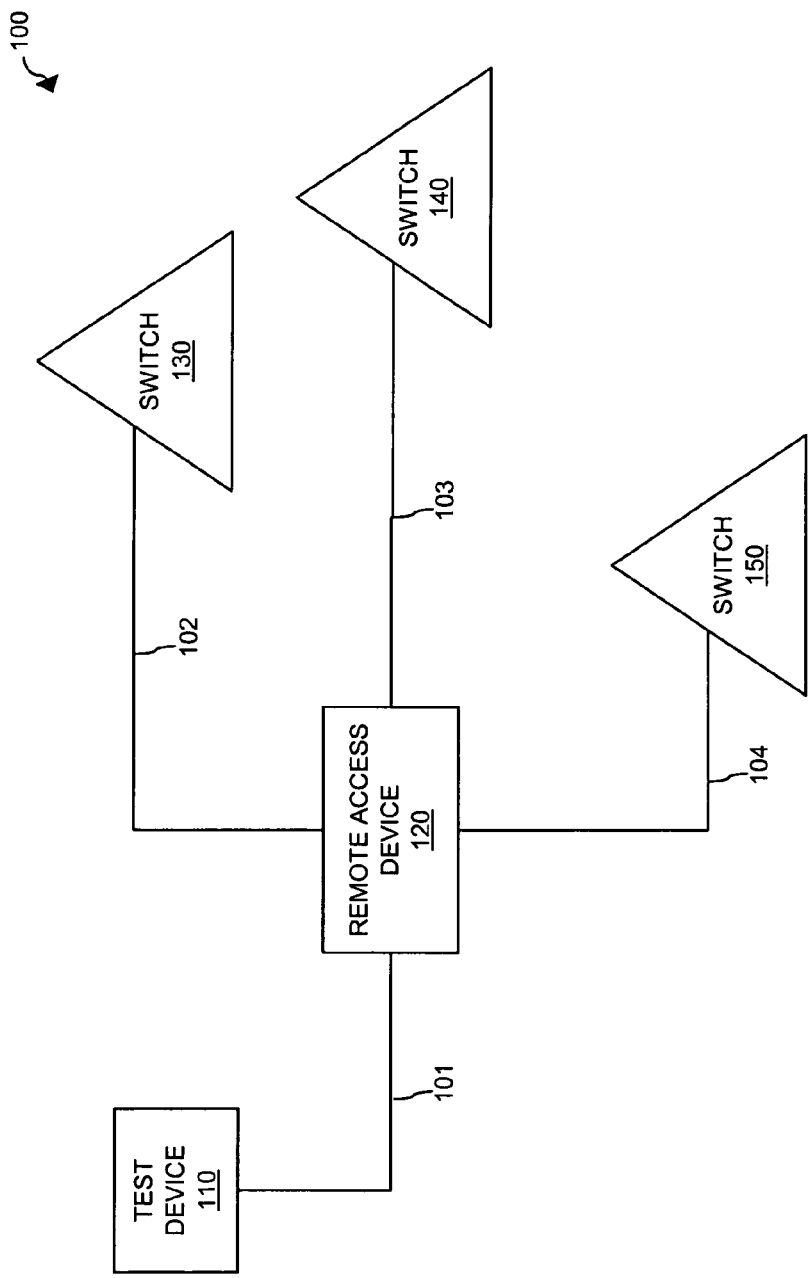
FIG. 1 illustrates the public switched telephone network in an example of the prior art.
Figure 2:
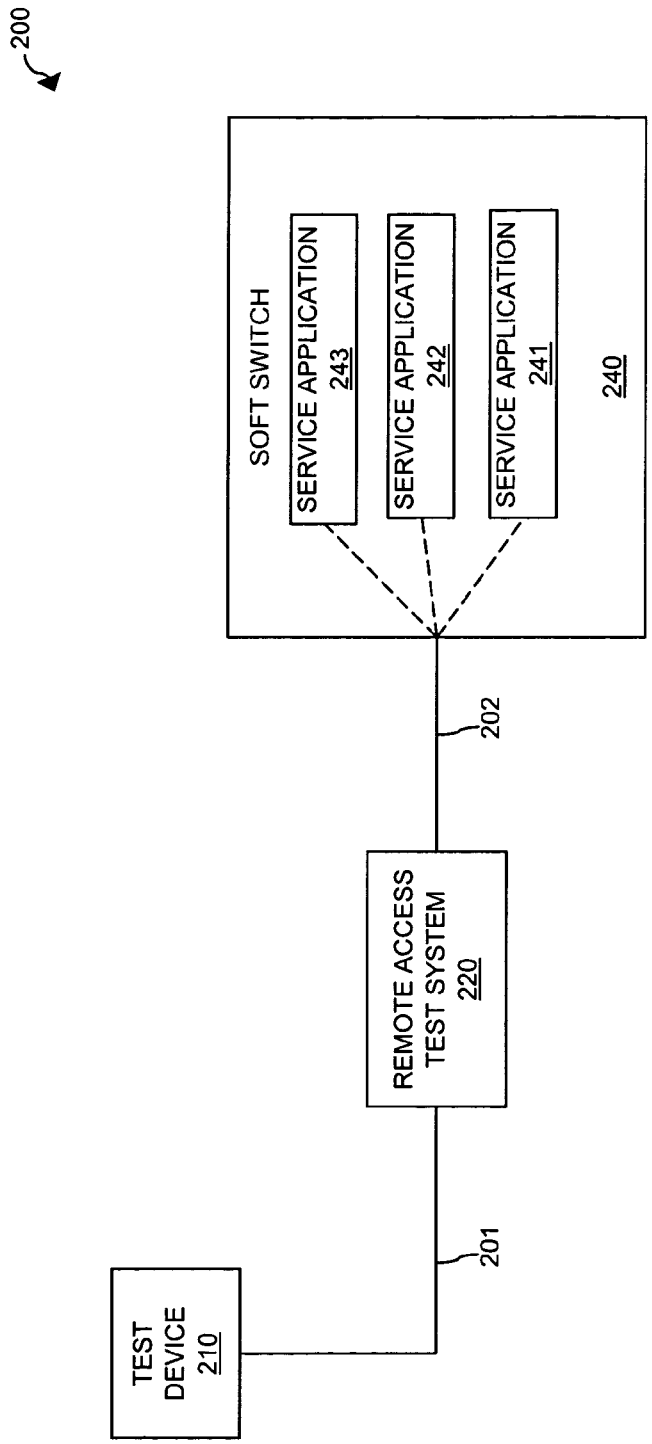
FIG. 2 illustrates a communication system in an embodiment of the invention.
Figure 3:
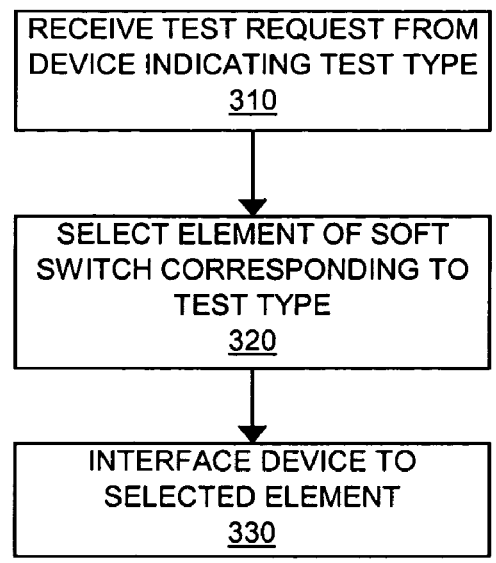
FIG. 3 illustrates a flowchart in an embodiment of the invention.

FIGS. 2 and 3

FIG. 2 illustrates communication system 200 in an embodiment of the invention. Communication system 200 includes remote access test system 220 (herein referred to as test system), test device 210, and soft switch 240. Soft switch 240 could also be referred to as a media gateway controller, as well as by other names. Soft switch 240 includes service applications 241, 242, and 243. Test device 210 is in communication with test system 220 by path 201. Test system 220 is in communication with soft switch 240 by path 202. Path 201 could be, for example, a time division multiplexed (TDM) communication path. Path 202 could be, for example, a packet based communication path.

In operation, test device 210 accesses test system 220 over path 201. For instance, test device 210 could dial into test system 220. Upon dialing into test system 220, a user utilizing test device 210 would enter a secure password. After verification, the user would then specify the type of test to perform on soft switch 240. The type of test could be, for example, a number translation test, routing test, line feature test, voicemail test, or trunking services test, as well as other types of tests. Each service application of soft switch 240 is configured for a particular type of test. Thus, depending upon the indicated test type, test system 220 interfaces test device 210 to the appropriate service application of soft switch 240.

FIG. 3 illustrates the operation of communication system 200 in an embodiment of the invention. To begin, test system 220 receives a test request from test device 210 (Step 310). The test request indicates a test type. For example, the test type could be a number translation test. A number translation test tests the phone number translation tables of soft switch 240. Test system 220 processes the test request to selects one of service applications 241, 242, and 243 that corresponds to the test type (Step 320). In the case of the test type being a number translation test, service application 242 could be the service application of soft switch 240 that performs number translations. Upon selecting service application 242, test system 220 interfaces test device 210 to soft switch 240 (Step 330). For example, test device 210 transmits communications in a TDM format over link 201 to test system 220. Test system 220 receives the TDM communications and converts them to a non-TDM format, such as a packet format. Test system 220 then transmits the packet communications over path 402 to service application 242.

Advantageously, communication system 200 provides call through testing capabilities to packet based communication networks, such as a VoP network, equal to the call through testing capabilities of the PSTN, but without requiring customized testing equipment for VoP networks. Any feature or function available to a VoP customer can be tested in communication system 200 remotely using testing equipment similar to testing equipment used for prior art PSTN testing. Furthermore, tests can be performed from a network operation center (NOC). This provides the further advantage of eliminating the need to test VoP services on location at customer sites. In a specific example of an advantage, customer turn-up verification can be performed remotely for a newly provisioned customer. This ensures that all soft switch operations for the customer, such as number translations and voicemail, are fully functional before completing the customer turn-up process.

Second Embodiment Configuration and Operation

FIGS. 4-7

Figure 4:
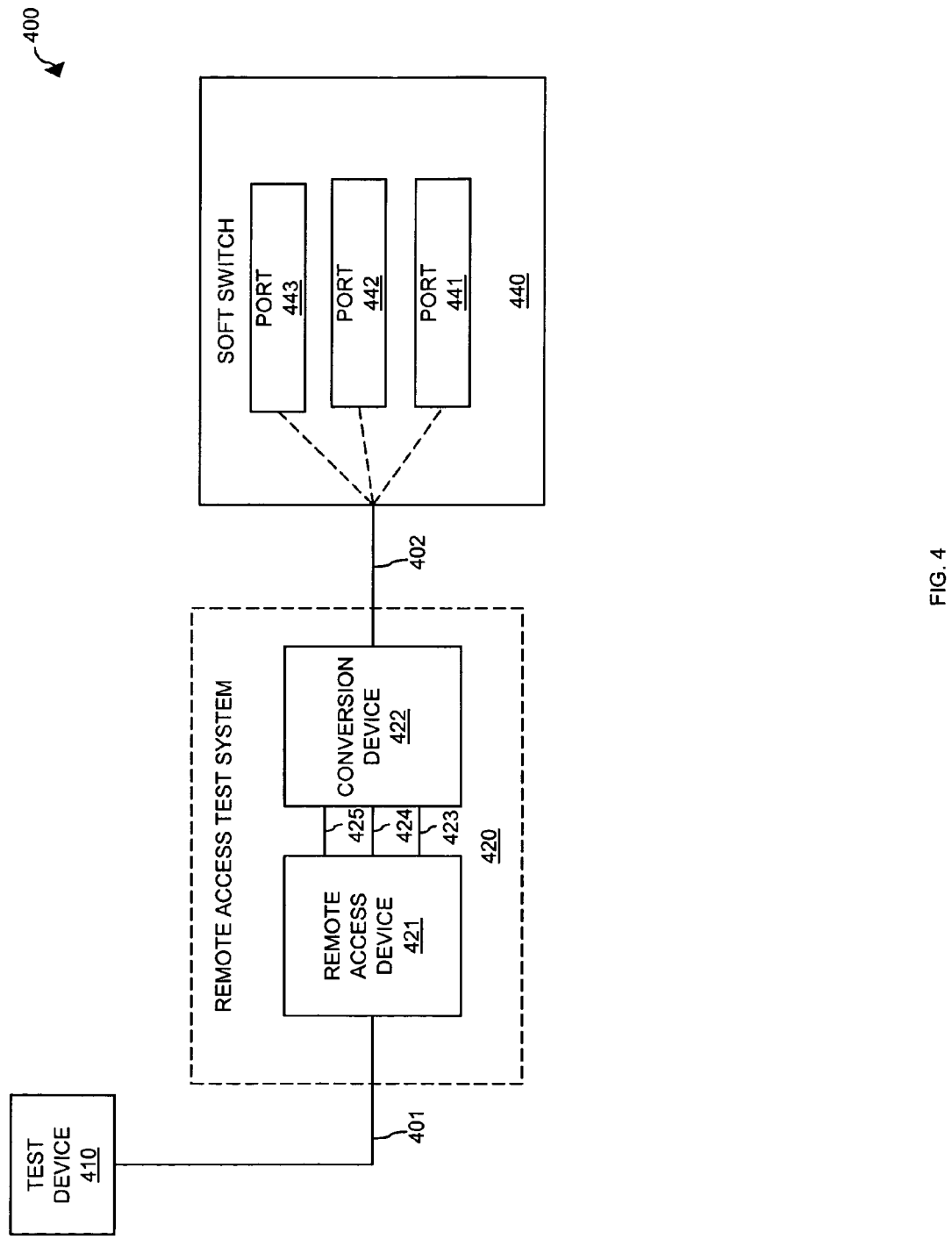
FIG. 4 illustrates a communication system in an embodiment of the invention.

FIG. 4 illustrates communication system 400 in an embodiment of the invention. Communication system 400 includes test device 410, remote access test system 420, and soft switch 440. Soft switch 440 could also be referred to as a media gateway controller, as well as by other names. Remote access test system 420 includes remote access device 421 and conversion device 422. Test device 410 is in communication with remote access device 421 over path 401. Conversion device 422 is in communication with soft switch 440 over path 402. Remote access device 421 is in communication with conversion device 422 over paths 423, 424, and 425.

Path 401 could be, for example, a TDM line over which test device 410 transmits dual-tone multi-frequency signals. Paths 423, 424, and 425 could also be TDM lines. Path 402 could be, for example, a packet based path. Path 402 could be directly provisioned to soft switch 440. Path 402 could also be any type of path through a packet network, such as the Internet. Path 402 could therefore traverse other network elements, such as switches and routers, although other elements are not shown for the sake of clarity. Soft switch 440 includes an interface to ports 443, 442, and 441. Communications transmitted from conversion device 422 therefore traverse path 402 and are received by the interface of soft switch 440. Depending upon the destination of the communications, they are transferred to either port 443, 442, or 441.

Figure 5:
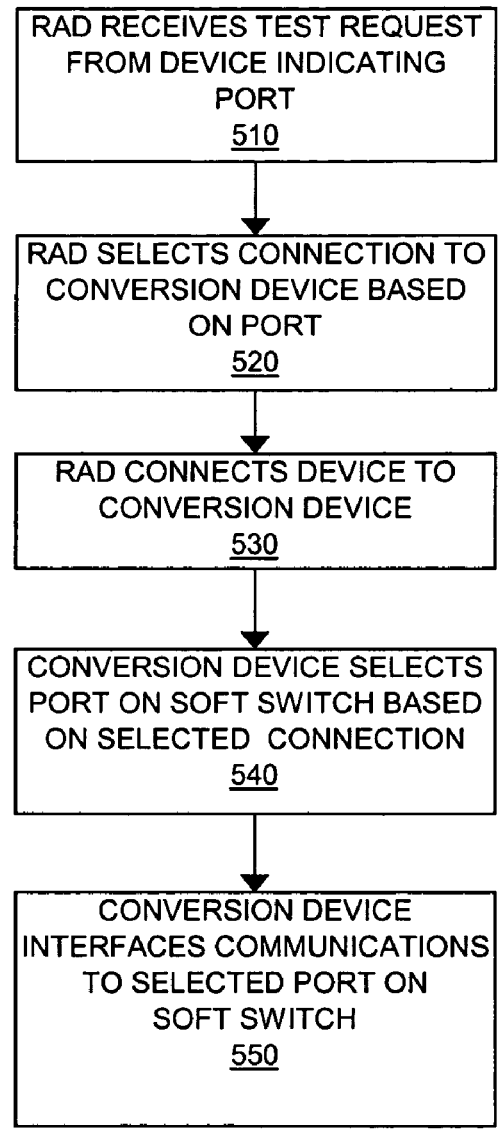
FIG. 5 illustrates a flowchart in an embodiment of the invention.

FIG. 5 illustrates the operation of communication system 400 in an embodiment of the invention. To begin, a user using test device 410 desires to test the operation of soft switch 440 for a newly provisioned customer. The user uses test device 410 to dial into remote access device 421 over path 401. A standard call is setup between test device 410 and remote access device 421. Upon being prompted, the user enters the port desired to be tested (Step 510). Each port 442, 442, and 443 is associated with configured for a specific service application. Each service application has been pre-configured in the soft switch with dialing features and route addressing. Each line 423, 424, and 425 coupling remote access device to conversion device 422 corresponds to one of ports 441, 442, and 443.

Remote access device 421 then selects and connects test device 410 to conversion device 422 over the line corresponding to the port indicated by the user (Steps 520 and 530). For example, if the user enters a code for port 443, remote access device 421 connects test device 410 to conversion device 422 over line 425. Conversion device 422 responsively establishes a connection to the appropriate port on soft switch 440—in this case, port 443 (Step 540). A communication channel is therefore established between test device 410 and port 443 for testing. Analog communications, such as DTMF tones, transferred by test device 410 to remote access device 421 are converted to a packet format by conversion device 422 (Step 550). The packets are addressed to port 443 and transferred over path 402.

In an alternative, the originating number associated with test device 410 is indicative of a particular service area. For example, the originating number could indicate an area code for a metropolitan area, such as Chicago. In this case, remote access test device 421 would read the originating number and determine the line 423, 424, or 425 that corresponds to Chicago. Assuming line 423 corresponds to Chicago, test device 410 would be connected to conversion device 422 over line 423. Conversion device 422 then responsively establishes a connection to the appropriate port on soft switch 440—in this case, port 441 (Step 540). A communication channel is therefore established between test device 410 and port 441 for testing. Analog communications, such as DTMF tones, transmitted by test device 410 to remote access device 421 are converted to a packet format by conversion device 422 (Step 550). The packets are addressed to port 441 and transferred over path 402. The service application associated with port 441 can then process communications from test device 410 in the same manner that any calls from the Chicago area would be processed. This enables a service technician to remotely test the performance of soft switch 440 from the perspective of a Chicago subscriber.

Figure 6:
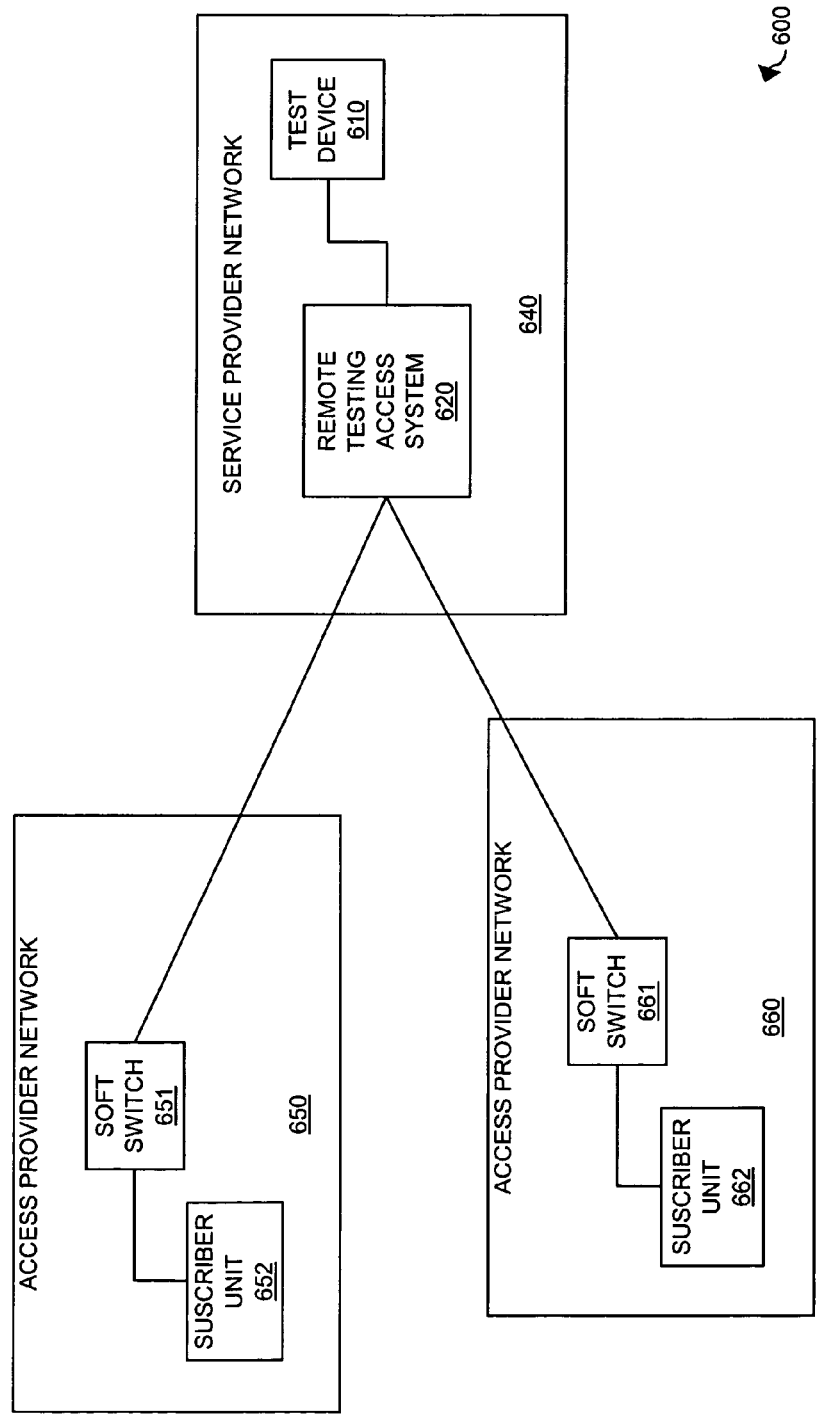
FIG. 6 illustrates a communication network in an embodiment of the invention.

FIG. 6 illustrates communication network 600 in an embodiment of the invention to illustrate a situation whereby communication system 400 is advantageously applied. Communication network 500 includes service provider network 640, access provider network 650, and access provider network 660. Service provider network 640 includes remote access testing system 620 and test device 610. Access provider network 650 includes soft switch 651 and subscriber unit 652. Access provider network 660 includes soft switch 661 and subscriber unit 660

In next generation network environments, such as communication network 600, access provider networks provide the first level of access to a customer, such as subscribers 652 and 662. An access provider network could be, for example, a packet based cable network. Service provider networks, such as network 640, provide the first level of service to customers. In this embodiment, subscribers using subscriber units 652 and 662 access services provided by service provider network 640 through access provided by access provider networks 650 and 660.

At times, it is desirable to test the operations of soft switches 651 and 661. However, both soft switches are typically located on the premises of access provider networks 650 and 660. Thus, technicians are not able to physically test soft switches 651 and 661. Instead, test device 610 is used to remotely access soft switches 651 and 660. Remote testing access system 620 interfaces test device 610 to soft switches 651 and 661. In this manner, the operator of service provider network 640 can ensure that soft switches 651 and 661 are operating in accordance with established service level agreements.

Figure 7:
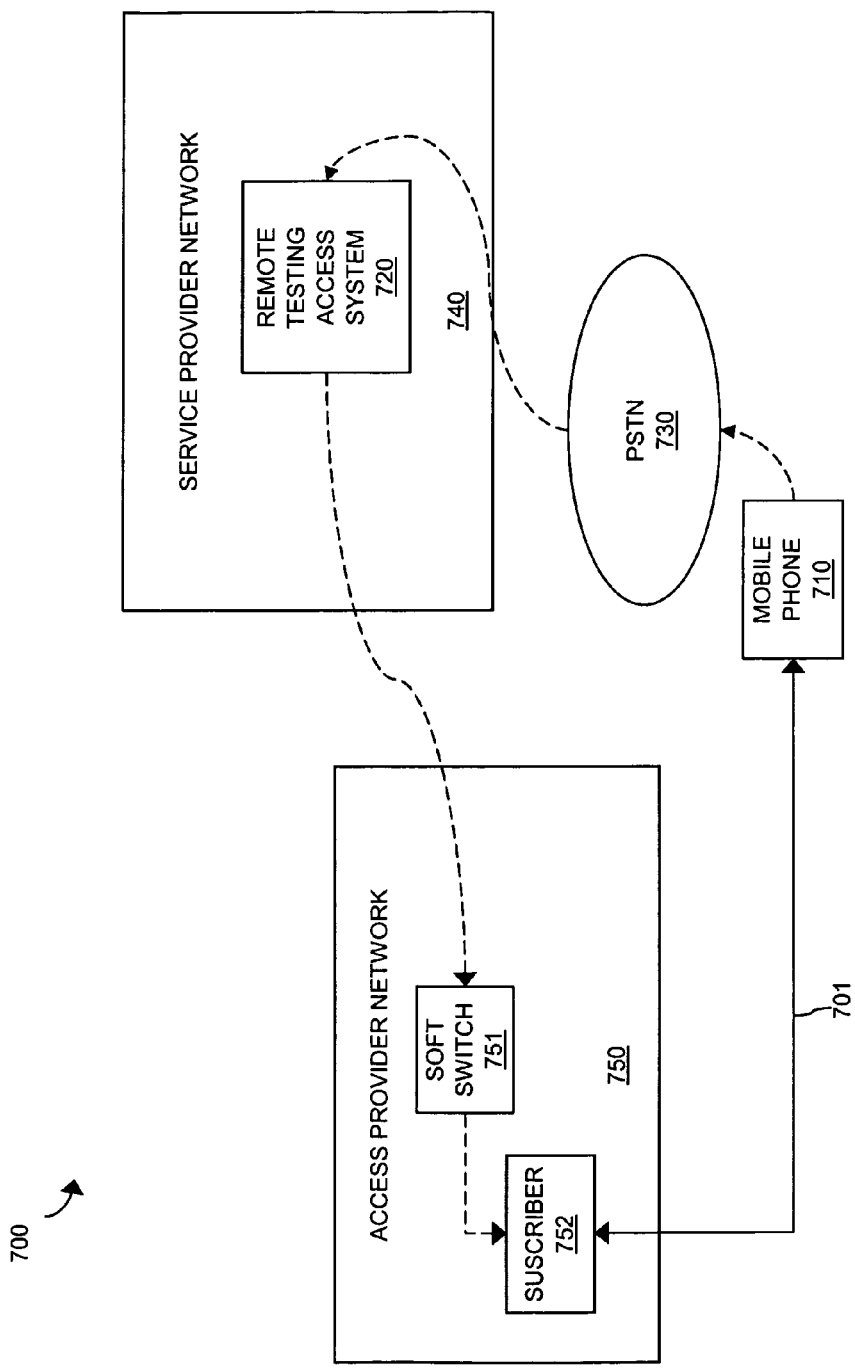
FIG. 7 illustrates a communication network in an embodiment of the invention.

FIG. 7 illustrates communication network 700 in an embodiment of the invention to illustrate another situation whereby communication system 400 is advantageously applied. In this embodiment, communication network 700 includes service provider network 740, access provider network 750, PSTN 730, and mobile phone 710. A test engineer using mobile phone 710 desires to test the performance of soft switch 751 with respect to newly provisioned services for subscriber 752. In this embodiment, subscriber subscribes to VoP services provided by service provider network 740. Access provider network 750 provides access to subscriber 752 for the service. Thus, a VoP call placed by subscriber 752 is routed to service provider network 740. Service provider network 740 the handles the call, either routing the call to PSTN 730 or to another communication network.

To initiate the test, the technician using mobile phone 710 dials remote testing access system 720. The call is connected to the mobile carrier (not shown) to PSTN 730. Just like any other call, PSTN 730 routes the call to its destination, which in this case is remote testing access system 720. Upon connecting the call, the user enters a subscriber identification for subscriber 752. The identification could be in the form of a phone number or a session initiation protocol (SIP) address, as well as in other forms. Remote testing access system 720 establishes a link to soft switch 751. Mobile phone 710 can then draw dial tone from soft switch 751 as if mobile phone 710 was the actual subscriber-subscriber 752, as illustrated by line 701. The technician can then enter a standard telephone number to test the translations of soft switch 751. Other operations could also be tested, such as voicemail and line features.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

What is claimed is:

1. A method of operating a remote testing access system, the method comprising:

receiving a test call in an access device from a test device over an incoming time division multiplexed (TDM) connection, receiving a test request in a TDM format over the call wherein the test request indicates a one port of a plurality of ports, wherein the plurality of ports correspond to a plurality of outgoing TDM connections coupling the access device to a conversion device, and wherein the plurality of outgoing TDM connections correspond to a plurality of service applications on a soft switch, and selecting and connecting the test call to the conversion device on a one outgoing TDM connection of the plurality of outgoing TDM connections that corresponds to the one port in response to the test request; and coupling the conversion device to the access device by the plurality of outgoing TDM connections and establishing a packet connection with a one service application of the plurality of service applications corresponding to the one outgoing TDM connection, receiving communications for the test call in a TDM format, converting the communications to a packet format, and transmitting communications for the test call to the one service application in the packet format over the packet connection;

in the access device, bridging the incoming TDM connection to the one outgoing TDM connection of the plurality of outgoing TDM connections based on the test request;

in the conversion device, selecting the one service application of the soft switch corresponding to the one outgoing TDM connection; and transmitting the communications in the packet format to the one service application.

2. The method of claim 1 further comprising providing dial tone to the test device from the soft switch.

3. The method of claim 1 wherein the one service application comprises a port on the soft switch.

4. The method of claim 1 wherein the one type of test comprises a number translation test.

5. The method of claim 1 wherein the test request comprises a dual tone multi-frequency (DTMF) signal.

6. A remote testing access system comprising:

an access device configured to receive a test call from a test device over an incoming time division multiplexed (TDM) connection, receive a test request in a TDM format over the call wherein the test request indicates a one port of a plurality of ports, wherein the plurality of ports correspond to a plurality of outgoing TDM connections coupling the access device to a conversion device, and wherein the plurality of outgoing TDM connections correspond to a plurality of service applications on a soft switch, and select and connect the test call to the conversion device on a one outgoing TDM connection of the plurality of outgoing TDM connections that corresponds to the one port in response to the test request; and the conversion device coupled to the access device by the plurality of outgoing TDM connections and configured to establish a packet connection with a one service application of the plurality of service applications corresponding to the one outgoing TDM connection, receive communications for the test call in a TDM format, convert the communications to a packet format, and transmit the communications for the test call to the one service application in the packet format over the packet connection;

wherein the access device is further configured to bridge the incoming TDM connection to the one outgoing TDM connection of the plurality of outgoing TDM connections based on the test request;

wherein the conversion device is further configured to select the one service application of the soft switch corresponding to the one outgoing TDM connection; and wherein the conversion device is further configured to transmit the communications in the packet format to the one service application.

7. The remote testing access system of claim 6 wherein the soft switch is configured to provide dial tone to the test device.

8. The remote testing access system of claim 6 wherein the one service application comprises a port on the soft switch.

9. The remote testing access system of claim 6 wherein the one type of test comprises a number translation test.

10. The remote testing access system of claim 6 wherein the test request comprises a dual tone multi-frequency (DTMF) signal.

* * * * *